United States Patent Office 3,151,987
Patented Oct. 6, 1964

3,151,987
METHOD FOR PRODUCING A MULTI-LAYER PASTRY-DOUGH
Shirley F. Colby, Yonkers, N.Y.
No Drawing. Filed Dec. 13, 1962, Ser. No. 244,265
17 Claims. (Cl. 99—92)

This invention relates to an improvement in pastry dough and the method of manufacture thereof, and is more particularly related to a pastry dough adapted for mass production facilities.

This application is a continuation-in-part of my application Serial No. 620,591 filed November 6, 1956, now abandoned, and my copending application Serial No. 843,647, filed October 1, 1959, now abandoned.

In the past, the art of making pastry, particularly puff pastry, has depended upon the hand-manipulative skills of the baker requiring intricate and delicate manipulative steps in producing the pastry dough prior to the baking step.

It is the general object of this invention to produce a high quality pastry dough which may be mass produced in a simple, reliable, and economical manner and from which a wide variety of baked products can be produced, including pies and the finer pastries which are at present made from puff pastry dough.

In accordance with the present invention, an entirely new kind of pastry dough is made in a very simple manner without the necessity of performing the intricate steps required in the past in the preparation of puff pastry dough. The pastry dough of this invention upon baking, results in a pastry having an appearance, texture, flakiness and taste comparable, if not superior, to the presently well-known pastries such as made from puff paste. Advantageously, the cost of the ingredients used in the pastry dough of the invention can be not only less than standard puff pastry but also less than pie dough.

The invention comprises generally the method of producing a multi-layer pastry dough convertible to a highly flaked product upon baking. More particularly, aerated flour and water are critically mixed to form a paste. The paste is then arranged in a sheet. Suitable shortening is then applied or spread as a sheet on the sheet of paste. The alternate sheeting and piling of paste and shortening is repeated to form a piled assembly of alternate sheets of paste and shortening; the top and bottom layers being a sheet of paste. The so-formed piled assembly is compressed by rollers or other suitable means to a desired thickness. This compressed laminate of, what I term, pastry dough, can then be cut into blocks suitable for packaging or baking.

According to the method of the invention the flour and water are present in such relative amounts and are admixed to a limited extent, viz., only sufficiently to form a paste wherein all of the water is absorbed by the flour and substantially all of the flour is wetted; both the absorption and wetting of the flour occurring without significant "gluten development" of the flour. "Gluten development" is further described hereafter. The mixing of the flour and water may be further characterized as that extent of mixing that forms a paste the texture of which may be characterized as rough and is distinguished from the prior art paste wherein the mixing of the flour and water is such as to form a paste the texture of which may be characterized as smooth.

The relative amounts of flour to water depend on the type and characteristic of the flour selected and the desired tenderness of the resulting baked pastry. A suitable ratio comprises 5 parts by weight of flour with 3 to 3½ parts by weight of water.

Although I prefer a hard-wheat flour, most of the commercially available flours can be used. The invention is especially suited to an all-purpose flour of the type sold under the trade names "Gold Medal All Purpose" or "Pillsbury All Purpose." Flours are classed as soft or hard or combinations in varying degrees of both. The degree of hardness increases with the increase of gluten content while the degree of softness increases with the decrease of gluten content. All-purpose flours usually contain a higher percentage of hard than soft wheat, while the hard flour, commonly known as Bakers Patent flour, contains the highest proportion of gluten and is the hardest of the usual commercial flours.

The method of the invention is illustrated in the examples set forth hereinafter.

The mixing of flour and water into a paste having the characteristics described above, involves, for each of the example recipes to be described, the use of a Hobart Model A–120 (Specification 2925) Three-Speed, Vertical Mixer.

This Hobart mixer is powered by a one-quarter h.p. electric motor driving an eccentric spindle at 84 r.p.m. for speed I, 130 r.p.m. for speed II, and 272 r.p.m. for speed III. A generally C-shaped dough hook, which is the component of the machine for mixing ingredients contained in the container portion of the mixer, is rotated by a shaft connected by gears to the eccentric spindle at 180 r.p.m. for speed I, 280 r.p.m. for speed II, and 580 r.p.m. for speed III.

One method of measuring the amount of mixing that is needed involves the use of a Barbender Farinograph, which operation is known in the art. Briefly, the paste under test is mixed in the mixer portion of the Farinograph which includes a freely suspended electric motor to the housing of which is attached a pen which records its movement on a sheet of moving paper. The torque exerted on the motor by the resistance offered by the dough to the movement of the mixer blade causes the motor and its housing to rotate through a small arc and this is reflected in a movement of the pen. The recording paper is, essentially, a graph calibrated along its moving axis perpendicular to its movement in units of consistency, more particularly, Barbender units. The scale of Barbender units is calibrated in a range of units from 0 to 1000, the higher the number of units, the greater the degree of consistency. The Farinograph plot not only records the consistency of mixture but also allows one to determine the elasticity of the mixture in Barbender units.

The Farinograph can be used to measure and record the consistency and elasticity of a mixture as the ingredients are mixed by the Farinograph itself or of a mixture mixed in a separate mixer. Since the Farinograph, to some extent is affected by the weight of the mixture regardless of its state of consistency, the weight of each sample to be tested must be equal to every other sample. In the examples to be described, the flour and water were first mixed in the Hobart mixer, and a sample of identical weight for each example was transferred to the Farinograph for determining its consistency and elasticity.

*Example 1*

(5 parts all-purpose flour, 3 parts water)

2000 grams of all-purpose flour was mixed with 1200 grams of water (75° F.) for 30 seconds at speed I and 30 seconds at speed II. In this, the desired state of the paste, by visual inspection, the mixture was such that all of the water was absorbed by the flour, and substantially all of the flour was wet. The Farinograph indicated a consistency of 390 Barbender units and an elasticity of 90 Barbender units.

*Example 2*

(5 parts all-purpose flour, 3½ parts water)

2000 grams of all-purpose flour was mixed with 1400 grams of water (75° F.) for 30 seconds at speed I and 20 seconds at speed II to effect the desired state of the paste. The Farinograph indicated a consistency of 285 Barbender units and an elasticity of 75 Barbender units.

*Example 3*

(5 parts hard flour, 3 parts water)

2000 grams of Bakers Patent (hard-wheat) flour was mixed with 1200 grams of water (75° F.) for 30 seconds at speed I and 35 seconds at speed II to effect the desired state of the paste. The Farinograph indicated a consistency of 240 Barbender units and an elasticity of 50 Barbender units.

*Example 4*

(5 parts hard flour, 3½ parts water)

2000 grams of Bakers Patent (hard) flour was mixed with 1400 grams of water (70° F.) for 30 seconds at speed I and 22 seconds at speed II to effect the desired state of the paste. No Farinograph measurements were made for this example.

Generally, the paste is made of a combination of either an all-purpose or Bakers Patent flour with water in ratios of 5 parts with 3 to 3.5 parts of water mixed only sufficiently to absorb all the water and substantially wet all of the dry flour. The extent of mixing necessary to effect the paste to the desired state, depends on the ratio of water and type of flour used.

Thus, although the described examples are for preferred recipes, it will be apparent to those skilled in the art that flours of different degrees of gluten content than those described, may be mixed into the desired state of the paste of the invention and that the extent of mixing needed will depend on the proportional amount of such flour and water.

The paste of the invention is suitably firm and of a consistency for sheeting directly from a dispensing container to a stationary or moving surface, such as a conveyor belt, through extruding nozzles of shape adapted to form a ribbon of paste. The water content, within the ranges above discussed, has been found to provide a paste of the most suitable consistency and firmness for the equipment used.

As noted above, the paste of this invention is not mixed as thoroughly as the paste used in prior puff pastry. Puff-pastry dough was made highly elastic to prevent puncturing by the high melting-point shortening during the formation of the dough. Elasticity is a function of the extent to which the gluten in the flour has been developed. As explained in Bakery Technology and Engineering, edited by Manual Matz, Avi Publishing Co., Inc. (1960) chapter I, mixing of the flour and water for puff paste is continued until the mix acquires a smoothness which indicates to the baker that the extent of mixing is adequate. Thus, smoothness is a measure of gluten development. As explained in this textbook, the elasticity of a mixture of flour and water is attributed to the phenomenon of the gluten molecules behaving like "coiled springs." The greater the extent of mixing, the more the elasticity property is developed. If the mixture is mixed beyond that at which maximum gluten development occurs, the molecules of gluten break down causing the paste to be soft and sticky. In the prior art of puff pastry preparation, the paste of flour and water is mixed to the maximum gluten development to effect a much greater elasticity and greater consistency than the paste of my invention. For example, in the examples described, the paste was mixed an additional period sufficient to determine the maximum gluten development as is the practice in the prior art of puff-pastry dough preparation. Maximum development occurred at the end of 5½ minutes of mixing at speed step II in Example 1, for which the consistency of the paste was 580 Barbender units and the elasticity was 150 Barbender units. Maximum gluten formation occurred at the end of 5½ minutes of mixing the paste of Example 3, for which the consistency was 760 Barbender units and the elasticity was 200 Barbender units.

As described above, the mixing of the flour and water into the paste used in this process is sufficient only to absorb the water and wet the flour without significant gluten development. The paste, so mixed, is rough in texture. Any mixing of the two ingredients less than that described is not useful since insufficient mixing results in a paste in which there is unmixed water or dry flour, either or both of which result in an inferior pastry. Mixing the ingredients beyond that described develops the gluten in the flour more and more as the mixing is extended, resulting in an elastic and smooth-surfaced paste. An elastic and smooth paste is not amenable to the piling principle of the present process since the thickness and width of the sheeted or piled paste layers would change during the process due to the elasticity of the paste and the smooth surface of the paste would not provide a surface to which a plastic shortening would adhere. From my experience with such well-worked dough, I have found it difficult, if not impossible, to extrude immediately a well-worked paste into a ribbon or sheet.

The process of the invention is flexible to allow for a variety of shortenings, and, in contrast to the art of puff pastry, is not limited to shortenings of an elevated melting point in the range of 130°–140° F. Any plastic shortening of a consistency not greater than the consistency of the paste may be used, including those plastic shortenings designed for ordinary bakery use. Thus, an all-purpose hydrogenated vegetagle shortening may be used as the shortening ingredient effecting an unexpectedly superior quality, appearance and taste of the product as compared to previous pastry proscribing such a shortening. The use of an hydrogenated vegetable shortening, which the present invention allows since the paste is not tough and highly elastic, obviates the usual need of a high-melting point shortening or specially-prepared butter or other specially processed shortenings such as, for example, is described in U.S. Patent 2,442,537 to Eckey, as is now the common practice in the preparation of known quality pastries such as puff pastry.

As known in the art, a compressometer or other similar testing device may be used to compare, by sample, the consistency of the paste and shortening prior to their use in the process.

The proportional part of shortening in the recipe is generally a matter of choice depending primarily on taste and economic factors. I have found that the same amount of shortening as the flour, by weight, results in a highly enriched pastry. I have found that 3 parts of shortening for each 5 parts of flour, both by weight, results in pastry that is less rich and advantageously less costly. I have found that as little as 2½ parts of shortening with 5 parts of flour is useful but probably not commercially acceptable because of the degraded taste qualities of what is expected in a fine pastry.

Thus, generally, the process of the invention includes the relative amounts of 2.5 to 5 parts of shortening and 3 to 3.5 parts of water for each 5 parts of flour, all of the parts being by weight.

An economic advantage of the invention is the high proportion of water used. It is believed that the greater amount of water is possible because substantially all of the particles of flour are not surrounded or coated by the shortening ingredient whereby the flour is left free to absorb and retain a greater proportion of water than has been heretofore considered practical for the purposes of preparing fine pastries. In the conventional pie-dough processes, shortening is so thoroughly worked into the mass of flour and water that much of the flour is made non-absorbent.

It should be noted that when the water is added to the flour during the mixing step, the ingredients are not worked or kneaded as is generally done in the formation of the paste in the making of puff pastry. The paste of this invention is a formless and relatively inelastic mass of dough in which the amount of water used forms a paste that is suitably firm to be extruded into a sheet. The paste should not be of a consistency which may be characterized as sticky or gluey or of a consistency as that of a batter. The flour which may be sifted several times to effect aeration of the flour is mixed with water only until all the water is absorbed and substantially all the dry flour has been wetted without significant gluten development, as described above. The air originally incorporated into the flour by the sifting remains in the paste and aids the leavening action of the dough when baked. In contrast to the paste prepared for puff pastry, which is well worked and is smooth, and in which the gluten is well developed, the paste of this invention is rough. The rough surface of the paste layer provides substantially greater adhering properties to the surface of a layer of shortening than that effected by the smooth surface of a well-worked paste to the surface of shortening. The bonding force is still greater when two surfaces of the rough paste are piled together. When the shortening is applied by spreading or extruding over the paste of the invention, the shortening adheres firmly to the surface of the paste, forming a firm bond to it and to a superimposed paste layer thereby providing bonding strength sufficient to withstand rough treatment and prevent slippage of the piled dough. The layers of paste and shortening when piled establish a unified or integrated mass that is not separable into discrete and distinguishable layers.

The process is especially suited for large scale automatic production. More particularly, as embodied for mass production facilities, the process comprises the steps of aerating a mix of flour and other desired dry ingredients such as salt and preservatives, and mixing to form a paste as described above in suitable mixer containers. The paste is continuously sheeted from a hopper by extruding nozzles onto a moving floured belt. The thickness of the sheeted paste is preferred to be one-half inch. The single-layer sheet of paste is passed under a vat of plastic shortening from which a ribbon of shortening is continuously extruded to cover the sheet of paste in the form of a film of a thickness depending on the proportional amount by weight relative to the proportions of flour, water and shortening used in the recipe. The ribbon or sheet of shortening is preferably of sufficient width to cover the edge-to-edge surface of the sheet of paste.

The sheeted paste coated with a sheet or ribbon of shortening is carried by the moving belt under similar sequent stations of alternately located paste and shortening extruders which extrude in turn, paste and shortening on the layered or piled dough. The number of layers that can be piled is limited, practically, by the number of extruding stations that can be conveniently located along a moving belt system. The number of layers is also dependent on the height and weight of the dough as the layers increase. Thus, a half-inch of paste and one-eighth inch layer of shortening would, for 24 such pairs of layers, be about fifteen inches high. The weight of such a pile is not unreasonably large and can be conveyed without difficulty.

The piled dough is then compressed to a thickness of about 2 inches by cylindrical pressure rollers or other suitable means. Desired lengths, for example, 6 to 10 feet, are then cut from the advancing length of the dough and transported to another, but halted, conveying-belt system and piled one atop another until a desired number of such sections provides the number of layers required. Thus, for a 400-layer dough, sixteen such sections are piled. The 384-layer mass is then compressed by conveying the mass through rollers.

Rest periods, as known in the art to relax the prior art well-developed dough, need not be as frequent as is the required practice of puff-pastry preparation since the dough made by my process has little or no elastic properties that would otherwise require rest periods. In the practice of my process there is no need to rest the dough during any of the steps. In the prior art processes, in contrast, resting during the process is required. If, nevertheless, resting or intermediate storage is desired, suitable arrangements in the system can be made, for example, by transporting the dough to a refrigerated area for rest or storage, and thereafter, transporting the rested or stored dough to the final compression equipment. The completed dough is then cut into blocks suitable for packaging or cut into shapes to be baked off into desired pastries. It will be appreciated that the number of layers and thus the number of flakes in the baked product is determined by choice, subject to the factors discussed above. In the above example, a dough having about 400 layers, appropriately compressed, produces a satisfactory pastry.

An additional step in practicing the invention for an especially fine tasting product consists of the addition of about one-sixth part of the shortening to the flour just prior to or just after the step of adding the water. This small proportional part of shortening is preferably added in the form of beads or a narrow ribbon by extrusion through nozzles or by any other known method. This shortening is added without thoroughly cutting it into the mix. It must not be so thoroughly mixed with the flour as to inhibit the absorption of water by the flour. I have discovered that such a step enhances the quality of the flakes produced. If this step is taken, the amount or proportion of shortening used for spreading or sheeting between layers of paste may be reduced proportionately.

As mentioned above, the choice of the shortening ingredient allows for a greater variety than heretofore considered possible. An all-purpose hydrogenated vegetable shortening of relatively low melting-point, such as commercial shortenings sold under the trade names Spry or Primex, has the advantage of eliminating the waxy aftertaste associated with pastry products of the prior art, employing high melting-point shortenings containing stearine fats or other hard-fat components such as in commercial roll-in puff pastry shortenings which have a melting point around 140° F., while the melting point of Spry, for example, is less than 120° F.

In the prior art of making puff pastry the baker is repeatedly warned that if the shortening is firmer than the paste it will result in piercing of the paste layers with subsequent running-off of the shortening during baking; and if the shortening is softer than the paste, then the layers of paste will slip in sheeting and result in lopsided pastries. For that reason, the consistencies of the usual puff-pastry shortenings and well-worked, smooth and tough paste are carefully equated, and then the paste and shortening are manipulated by turning, rolling and folding. Such careful and intricate handling is unnecessary in the practice of my invention.

In the prior art the baker is cautioned to seal the shortening into the paste before rolling so as to prevent the shortening from leaking or oozing out of the paste and to trap as much air as possible and thus contribute to the leavening action during baking. By contrast with the foregoing, according to my process there is no need to seal the shortening within the paste because the bonding effect that results from the highly adhering action of the rough surface of the paste prevents the shortening from oozing under compression. Sufficient air has been incorporated in the paste as a result of sifting of the flour sufficiently to leaven the dough.

According to this invention, moreover, no turning of the dough is necessary as taught by the prior art, affording its production in a uniform, continuous sheet, on a large scale basis. In baking, the large amount of water is converted to steam which has the desirable effect of forcing apart the flakes lubricated by the shortening. It is necessary only to assemble a number of sheets, separated by shortening, to produce a laminated dough product by mere compression of the laminate with as many flakes as desired. These flakes may be compressed to a desired thickness by one compression step or by a number of compression steps introduced at various stages of piling.

I claim:

1. A method of producing a multi-layer pastry dough convertible to a highly flaked product upon baking comprising mixing aerated flour and sufficient water to form a paste of rough texture and sufficient firmness to be extruded, the mixing of the flour and water being adequate only to absorb all the water, wet substantially all of the flour, and without substantial gluten development, forming the paste in a sheet, applying plastic shortening to the sheet of paste, said plastic shortening having a consistency not greater than that of the paste, repeating the above-recited steps to form a plurality of piled alternating sheets of paste and shortening, thereafter compressing the piled sheets to a desired thickness.

2. The method according to claim 1 wherein the consistency of the shortening is the same as the consistency of the paste.

3. A method of producing a multi-layer pastry dough, convertible to a highly flaked product upon baking comprising mixing to form a paste about 5 parts of aerated flour and about 3 to 3.5 parts of water, the mixing of the flour and water being adequate only to absorb all the water, wet substantially all of the flour, and without substantial gluten development, forming the paste in a sheet, said paste being of rough texture and sufficient firmness to be extruded, extruding a portion of the paste in the form of an individual sheet, extruding plastic shortening to cover the sheet of the paste, said plastic shortening having a consistency not greater than that of the paste, repeating the above-recited extrusion steps to form a plurality of piled alternating sheets of paste and shortening, thereafter compressing the piled sheets to a desired thickness, all of said parts being by weight.

4. The method according to claim 3 wherein the consistency of the shortening is the same as the consistency of the paste.

5. A method of producing a multi-layer pastry dough, convertible to a highly flaked product upon baking comprising mixing to form a paste about 5 parts of an aerated flour and about 3 to 3½ parts of water only sufficiently to absorb all the water and substantially wet all of the dry flour and without substantial gluten development, extruding a portion of the paste in the form of an individual sheet, extruding about 2½ to 5 parts of plastic shortening to cover the sheet of paste, said plastic shortening having a consistency not greater than that of the paste, extruding another portion of the paste to cover the sheet of shortening, compressing the sheets to desired thickness, thereby forming a laminate, repeating the above-recited extrusion steps to form a plurality of individual laminates, and piling each of the laminates one atop the other, thereafter compressing the piled laminate to desired thickness, all of said parts being by weight.

6. The method according to claim 5 wherein the consistency of the shortening is the same as the consistency of the paste.

7. A method of producing a multi-layer pastry dough, convertible to a highly flaked product upon baking comprising mixing to form a paste about 5 parts of an aerated flour with about 3 parts of water and about 1/50 part of salt, only sufficiently to absorb all the water and wet substantially all of the dry flour, sheeting into sheets a portion of said paste, coating said sheets with plastic shortening, said shortening having a consistency the same as the consistency of the paste, piling several of said sheets covered by said shortening into a multi-ply laminate and compressing said laminated assembly of sheets to desired thickness, said shortening being present in quantity of about 3 parts, all of said parts being by weight.

8. The method as defined in claim 7 wherein the shortening is a hydrogenated shortening.

9. A method according to claim 7, wherein said shortening is of a softer consistency than said paste.

10. A method according to claim 7 wherein said shortening is a hydrogenated vegetable shortening.

11. A method of producing a multi-layer pastry dough, convertible to a highly flaked product upon baking, comprising mixing to form a paste about 5 parts of an aerated flour and about 3 parts of water only sufficiently to absorb all the water and substantially wet all of the dry flour, extruding a portion of the paste in the form of an individual sheet, extruding 3 parts of plastic shortening to cover the sheet of paste, said plastic shortening having a consistency softer than that of the paste, extruding another portion of the paste to cover the sheet of shortening, compressing the sheets to desired thickness, thereby forming a laminate, repeating the above-recited extrusion steps to form a number of individual laminates, and piling each of the laminates one atop the other, thereafter compressing the piled laminate to desired thickness, all of said parts being by weight.

12. The method according to claim 11 wherein the consistency of the shortening is the same as the consistency of the paste.

13. A method of producing a multi-layer pastry dough, convertible to a highly flaked product upon baking comprising mixing aerated flour and water to form a paste, sheeting said paste, covering said sheeted paste with plastic shortening, said shortening having a consistency the same as that of the paste, repeating the above-recited sheeting and covering steps by piling alternate individual layers of paste and shortening to form a laminated pile of individual sheeted paste layers interleaved with shortening thereafter compressing the desired laminate to desired thickness, the parts by weight being about 5 parts flour, 3 parts water and 3 parts shortening.

14. A method according to claim 13 including the step of mixing said flour and water sufficiently only to absorb all the water and substantially wet all of the dry flour.

15. A method according to claim 13 wherein the shortening is of a consistency less than that of the paste.

16. The method as defined in claim 7 further comprising the steps of piling several of said compressed multi-ply laminates and compressing the piled multi-ply laminate to desired thickness.

17. The method as defined in claim 7 further comprising the steps of adding particles of about one-sixth part of the shortening to the flour and water mix, and mixing the flour, water and shortening sufficiently only to distribute the particles of shortening throughout the paste.

References Cited in the file of this patent

UNITED STATES PATENTS 2,442,537    Eckey _____ Jan. 22, 1947

OTHER REFERENCES

"Everybody's Cook Book," 1924, by Lord, published by Henry Holt and Company (New York), page 590.